(12) United States Patent
Martignago et al.

(10) Patent No.: US 12,018,666 B2
(45) Date of Patent: Jun. 25, 2024

(54) DISCHARGE VALVE ARRANGEMENT FOR A REFRIGERANT COMPRESSOR

(71) Applicant: Danfoss Commercial Compressors, Trevoux (FR)

(72) Inventors: Clement Martignago, Trévous (FR); Alain Picavet, Saint-Cyr sur le Rhône (FR); Alexis Delorme, Nordborg (DK)

(73) Assignee: DANFOSS COMMERCIAL COMPRESSORS, Trevoux (FR)

( * ) Notice: Subject to any disclaimer, the term of this patent is extended or adjusted under 35 U.S.C. 154(b) by 0 days.

(21) Appl. No.: 17/831,822

(22) Filed: Jun. 3, 2022

(65) Prior Publication Data

US 2022/0397109 A1 Dec. 15, 2022

(30) Foreign Application Priority Data

Jun. 14, 2021 (FR) ...................................... 21/06240

(51) Int. Cl.
| | |
|---|---|
| *F04B 39/10* | (2006.01) |
| *F04B 39/00* | (2006.01) |
| *F04B 39/08* | (2006.01) |
| *F16K 15/02* | (2006.01) |

(52) U.S. Cl.
CPC ...... *F04B 39/1066* (2013.01); *F04B 39/0055* (2013.01); *F04B 39/08* (2013.01); *F16K 15/025* (2013.01); *F04B 39/102* (2013.01); *Y10T 137/7937* (2015.04)

(58) Field of Classification Search
CPC .............. F04B 39/1022; F04B 39/1066; F16K 15/028; Y10T 137/7785; Y10T 137/7795
See application file for complete search history.

(56) References Cited

U.S. PATENT DOCUMENTS

| | | | |
|---|---|---|---|
| 1,915,694 A | 6/1933 | Reindel | |
| 2,025,240 A * | 12/1935 | Higham | ................ F16K 15/063 417/571 |
| 2,118,356 A | 5/1938 | Money | |
| 2,588,112 A | 3/1952 | Lars | |
| 2,727,531 A * | 12/1955 | Blackford | ............. F16K 15/028 137/516.13 |
| 2,935,248 A | 5/1960 | Gerteis | |

(Continued)

*Primary Examiner* — Robert K Arundale
(74) *Attorney, Agent, or Firm* — McCormick, Paulding & Huber PLLC

(57) ABSTRACT

The discharge valve arrangement (17) includes a valve plate (18) including a discharge passage (22) and a valve seat (23) surrounding the discharge passage (22); a valve housing (24) being secured to the valve plate (18) and including a bottom portion (25) facing away from the valve plate (18), a sidewall (26) extending from the bottom portion (25) and towards the valve plate (18), and a discharge opening (28) formed in the sidewall (26); a valve member (31) displaceable between a closed position in which the valve member (31) closes the discharge passage (22) and an open position in which the valve member (31) opens the discharge passage (22). The valve housing (24) includes a gas damping chamber defined by the bottom portion (25) and the sidewall (26) and being configured to accommodate the valve member (31) in the open position; and an exhaust opening (37) formed in the bottom portion (25) and emerging in the gas damping chamber.

16 Claims, 3 Drawing Sheets

(56) References Cited

U.S. PATENT DOCUMENTS

| | | | | |
|---|---|---|---|---|
| 4,286,620 | A | * | 9/1981 | Turney ................ F16K 27/0263 137/454.2 |
| 4,469,126 | A | * | 9/1984 | Simpson ............... F04B 39/102 137/543.19 |
| 4,470,774 | A | * | 9/1984 | Chambers ........... F04B 39/1086 417/567 |
| 4,548,234 | A | * | 10/1985 | Prenger ............... F16K 17/0413 137/540 |
| 4,729,402 | A | * | 3/1988 | Blass .................... F16K 15/064 137/543.17 |
| 5,839,468 | A | * | 11/1998 | Allred ................... F16K 15/028 137/543.19 |
| 5,960,825 | A | * | 10/1999 | Scancarello ........ F16K 15/1401 137/856 |
| 6,044,862 | A | * | 4/2000 | Schumann .......... F16K 15/1401 137/856 |
| 6,164,334 | A | * | 12/2000 | Wallis ................. F16K 15/1441 137/856 |
| 6,227,240 | B1 | * | 5/2001 | Wu ....................... F16K 15/026 137/516.29 |
| 2002/0096217 | A1 | * | 7/2002 | Wu ....................... F16K 15/028 137/543.19 |
| 2009/0136366 | A1 | * | 5/2009 | Taguchi ................ F04B 49/225 417/312 |
| 2010/0294972 | A1 | * | 11/2010 | Park ..................... F16K 15/026 251/337 |
| 2011/0033289 | A1 | * | 2/2011 | Tseng ........................ A47L 9/00 415/208.1 |

\* cited by examiner

DISCHARGE VALVE ARRANGEMENT FOR A REFRIGERANT COMPRESSOR

CROSS-REFERENCE RELATED TO APPLICATION

This application claims foreign priority benefits under U.S.C. § 119 from French Patent Application No. 21/06240 filed Jun. 14, 2021, the content of which is hereby incorporated by reference in its entirety.

TECHNICAL FIELD

The invention relates to a discharge valve arrangement for a refrigerant compressor, especially for a refrigerant reciprocating compressor.

BACKGROUND

As known, a refrigerant reciprocating compressor comprises:
- a cylinder block defining a cylinder,
- a valve plate secured to the cylinder block and closing an end of the cylinder, the valve plate including at least one suction passage emerging in a compression chamber, defined by the cylinder and the valve plate, and being configured to be fluidly connected to a suction chamber of the refrigerant reciprocating compressor, the valve plate further including a discharge opening which is fluidly connected to the compression chamber,
- a suction valve configured to allow a flow of refrigerant through the at least one suction passage only from the suction chamber towards the compression chamber,
- a valve housing attached to the valve plate on a side remote from the cylinder,
- a central cone attached to the valve housing and facing the cylinder, the central cone defining, together with the discharge opening formed in the valve plate, a ring-shaped discharge passage,
- a valve member having a flat ring shape and being arranged within an inner space of the valve housing, the valve member being displaceable between a closed position in which the valve member closes the discharge passage, and an open position in which the valve member is remote from the valve plate and opens the discharge passage,
- a biasing member configured to bias the valve member against the valve member, and
- a piston received in the cylinder and configured to perform a reciprocating movement within the cylinder along a suction stroke during which refrigerant is sucked into the compression chamber via the at least one suction passage and a compression stroke during which refrigerant is compressed in the compression chamber and then discharged out of the compression chamber through the discharge passage.

Particularly, the valve member is closing the discharge passage as long as the cylinder pressure is lower than the sum of the pressure in the discharge chamber and the pressure exerted by the biasing member on the valve member. When the cylinder pressure exceeds said sum, the valve member moves away from the valve plate and opens the discharge passage.

Since the valve member and the biasing member are arranged between the valve plate and a stop surface of the valve housing and since the valve member opens as at high speed, the sub-assembly, formed by the valve member and the biasing member, abuts against the stop surface at each opening of the valve member. Such abutment during the opening movement of the valve member creates noise at each piston cycle.

Further, the discharge valve arrangement, formed by the valve plate, the valve housing, the central cone, the valve member and the biasing member, is complicated to assemble and expensive to manufacture.

SUMMARY

It is an object of the present invention to provide an improved refrigerant compressor which can overcome the drawbacks encountered in conventional refrigerant compressors.

Another object of the present invention is to provide a discharge valve arrangement, for a refrigerant compressor, which creates less noise and is less costly in manufacturing.

According to the invention such a discharge valve arrangement, for example for a refrigerant reciprocating compressor, includes:
- a valve plate configured to be secured to the refrigerant compressor, the valve plate including a discharge passage, which is configured to be fluidly connected to a compression chamber of the refrigerant compressor, and a valve seat surrounding the discharge passage,
- a valve housing being secured to the valve plate, the valve housing including a bottom portion facing away from the valve plate and a sidewall extending from the bottom portion and towards the valve plate, the bottom portion and the sidewall defining an inner space, the valve housing further including at least one discharge opening formed in the sidewall of the valve housing and configured to allow a flow of compressed gas from the discharge passage and towards a discharge chamber of the refrigerant compressor,
- a valve member having a plate shape and being arranged within the inner space of the valve housing, the valve member being displaceable between a closed position in which the valve member bears against the valve seat and closes the discharge passage, and an open position in which the valve member is remote from the valve seat and the at least one discharge opening is fluidly connected to the discharge passage, and
- a biasing member configured to bias the valve member against the valve seat,
- wherein the valve housing includes a gas damping device including:
- a gas damping chamber defined by the bottom portion and the sidewall of the valve housing, the biasing member being at least partially arranged within the gas damping chamber and the gas damping chamber being configured to accommodate the valve member when the valve member is in the open position, and
- an exhaust opening formed in the bottom portion and emerging in the gas damping chamber, the exhaust opening being configured to fluidly connect the gas damping chamber with the discharge chamber of the refrigerant compressor.

When the valve member is displaced in the open position and is at least partially accommodated in the first gas pocket, the gas contained in the gas damping chamber flows out of the gas damping chamber only through the exhaust opening and a radial clearance between the valve member and the sidewall of the valve housing, which induces an increase of gas pressure within the gas damping chamber and hence a damping of the valve member. Such a damping of the valve member decelerates the valve member and thus avoids an impact between the valve member and the bottom surface of the bottom portion The provision of such a gas damping device allows to obtain a fast deceleration of the valve member during its opening movement (particularly as soon as the valve member has passed the at least one discharge opening formed in the sidewall) and thus to avoid or substantiality reduce collision of the valve member and/or the biasing member against a stop surface of the valve housing at each opening cycle of the valve member.

Consequently, the noise generated by the discharge valve arrangement at each compression cycle of the reciprocating piston is substantially reduced.

Further, the configuration of the discharge valve arrangement according to the present invention reduces the assembly time of the various parts of said discharge valve arrangement, and thus simplifies the manufacturing process of the discharge valve arrangement.

The discharge valve arrangement may also include one or more of the following features, taken alone or in combination.

According to an embodiment of the invention, the exhaust diameter of the exhaust opening is configured to tune the increase of gas pressure within the gas damping chamber during the opening movement of the valve member, and hence the deceleration of the valve member.

According to an embodiment of the invention, the exhaust diameter of the exhaust opening also ensures a fast closing of the valve member at the end of a compression phase of the refrigerant compressor, and particularly at the end of a compression stroke of a compressor piston when the refrigerant compressor is a refrigerant reciprocating compressor, by allowing a flow of gas at discharge pressure, through the exhaust opening, from the discharge chamber into the gas damping chamber.

According to an embodiment of the invention, the valve housing is configured to retain the valve member in the inner space of the valve housing.

According to an embodiment of the invention, the sidewall of the valve housing is configured to guide the valve member during its displacements between the closed position and the open position.

According to an embodiment of the invention, the valve member has a circular plate shape, i.e. a disc shape.

According to an embodiment of the invention, the gas damping chamber includes:
- a first gas pocket defined by a bottom surface of the bottom portion and the sidewall of the valve housing, the first gas pocket at least partially housing the biasing member and being configured to accommodate the valve member when the valve member is in the open position, the first gas pocket having a first pocket depth, and
- a second gas pocket formed in the bottom surface of the bottom portion, the exhaust opening emerging in the second gas pocket and being configured to fluidly connect the second gas pocket with the discharge chamber of the refrigerant compressor, the second gas pocket having a second pocket depth.

According to an embodiment of the invention, the first gas pocket has a circular shape and has a first diameter larger, and particularly slightly larger, than an outer diameter of the valve member.

According to an embodiment of the invention, the second gas pocket has a circular shape and has a second diameter smaller than the outer diameter of the valve member.

According to an embodiment of the invention, the first diameter of the first gas pocket is between a minimal diameter value being equal to 10 times the sum of the first and second gas pocket depths and a maximal diameter value being equal to 20 times the sum of the first and second gas pocket depths. Such a configuration of the first gas pocket induces a quick increase of gas pressure within the gas damping chamber during an opening movement of the valve member and thus a quick stop of the valve member.

According to an embodiment of the invention, the first gas pocket depth of the first gas pocket is between a first minimal depth value being equal to 0.1 times the valve thickness of the valve member and a first maximal depth value being equal to 4 times the displacement stroke of the valve member. The first gas pocket depth of the first gas pocket is the axial distance between the upper edge of the at least one discharge opening formed in the sidewall and the bottom surface of the bottom portion of the valve housing.

According to an embodiment of the invention, the second gas pocket depth of the second gas pocket is between a second minimal depth value being equal to 0.1 times the valve thickness of the valve member and a second maximal depth value being equal to 4 times the displacement stroke of the valve member. The depth of the second gas pocket is the axial distance between the bottom surface of the bottom portion and a pocket bottom surface of the second gas pocket.

According to an embodiment of the invention, the exhaust opening has an exhaust diameter which is between a minimal exhaust diameter being equal to the valve thickness of the valve member and a maximal exhaust diameter being equal to 4 times the displacement stroke of the valve member.

According to an embodiment of the invention, the first and second gas pockets are coaxially arranged.

According to an embodiment of the invention, the exhaust opening is centrally located in the bottom portion.

According to an embodiment of the invention, the exhaust opening and the first and second gas pockets are coaxially arranged.

According to an embodiment of the invention, the valve housing has a cup shape.

According to an embodiment of the invention, the discharge passage provided on the valve plate has a circular shape. The discharge passage has particularly a circular shape since, contrary to the prior art, no central cone element is attached to the valve housing and protrudes in the discharge passage. Such a configuration of the discharge valve arrangement reduces its manufacturing costs.

According to an embodiment of the invention, the valve housing further includes mounting portions radially protruding from an outer surface of the sidewall of the valve housing, the mounting portions being secured to the valve plate, e.g. by rivets arranged in bores formed in the mounting portions.

According to an embodiment of the invention, the valve plate includes a first face configured to be oriented towards the compression chamber of the refrigerant compressor and a second face opposite to the first face and oriented towards the valve housing, the valve seat being arranged on the second face of the valve plate.

According to an embodiment of the invention, the at least one discharge opening is located adjacent the second face of the valve plate.

According to an embodiment of the invention, the at least one discharge opening extends in a circumferential direction with respect to an axial axis of the valve housing.

According to an embodiment of the invention, the at least one discharge opening extends between two adjacent mounting portions.

According to an embodiment of the invention, the valve housing includes several discharge openings distributed around an axial axis of the valve housing.

According to an embodiment of the invention, the valve member is displaceable inside the inner space along a displacement direction which is substantially parallel to an axial axis of the valve housing.

According to an embodiment of the invention, the sidewall of the valve housing is cylindrical.

According to an embodiment of the invention, the sidewall of the valve housing extends in a perpendicular direction from the bottom portion.

According to an embodiment of the invention, the biasing member is annular and has an outer diameter which is substantially equal to the outer diameter of the valve member.

According to an embodiment of the invention, the biasing member may be a helical spring, a wave spring, a curved spring washer, a wave spring washer. The wave spring may include a single wave ring or may include wave rings stacked and attached to one another in crest to crest configuration.

According to an embodiment of the invention, in the open position, the valve member is floating inside the inner space of the valve housing, and it is only supported by the biasing member.

The present invention also relates to a refrigerant compressor, for example a refrigerant reciprocating compressor, including a discharge valve arrangement according to the present invention.

According to an embodiment of the invention, the refrigerant reciprocating compressor includes a hermetic casing; an electric motor disposed in the hermetic casing and including a stator and a rotor; a drive shaft connected the rotor; a reciprocating compression unit disposed in the hermetic casing and configured to compress a refrigerant, the reciprocating compression unit including a cylinder block provided with a cylinder, and a piston reciprocatingly received in the cylinder and drivingly connected to the drive shaft.

According to an embodiment of the invention, the valve plate of the discharge valve arrangement is secured to cylinder block, and the valve plate, the cylinder and the piston delimiting a compression chamber.

These and other advantages will become apparent upon reading the following description in view of the drawing attached hereto representing, as non-limiting example, one embodiment of a refrigerant compressor according to the invention.

BRIEF DESCRIPTION OF THE DRAWINGS

The following detailed description of one embodiment of the invention is better understood when read in conjunction with the appended drawings being understood, however, that the invention is not limited to the specific embodiment disclosed.

DETAILED DESCRIPTION

Figure 1:
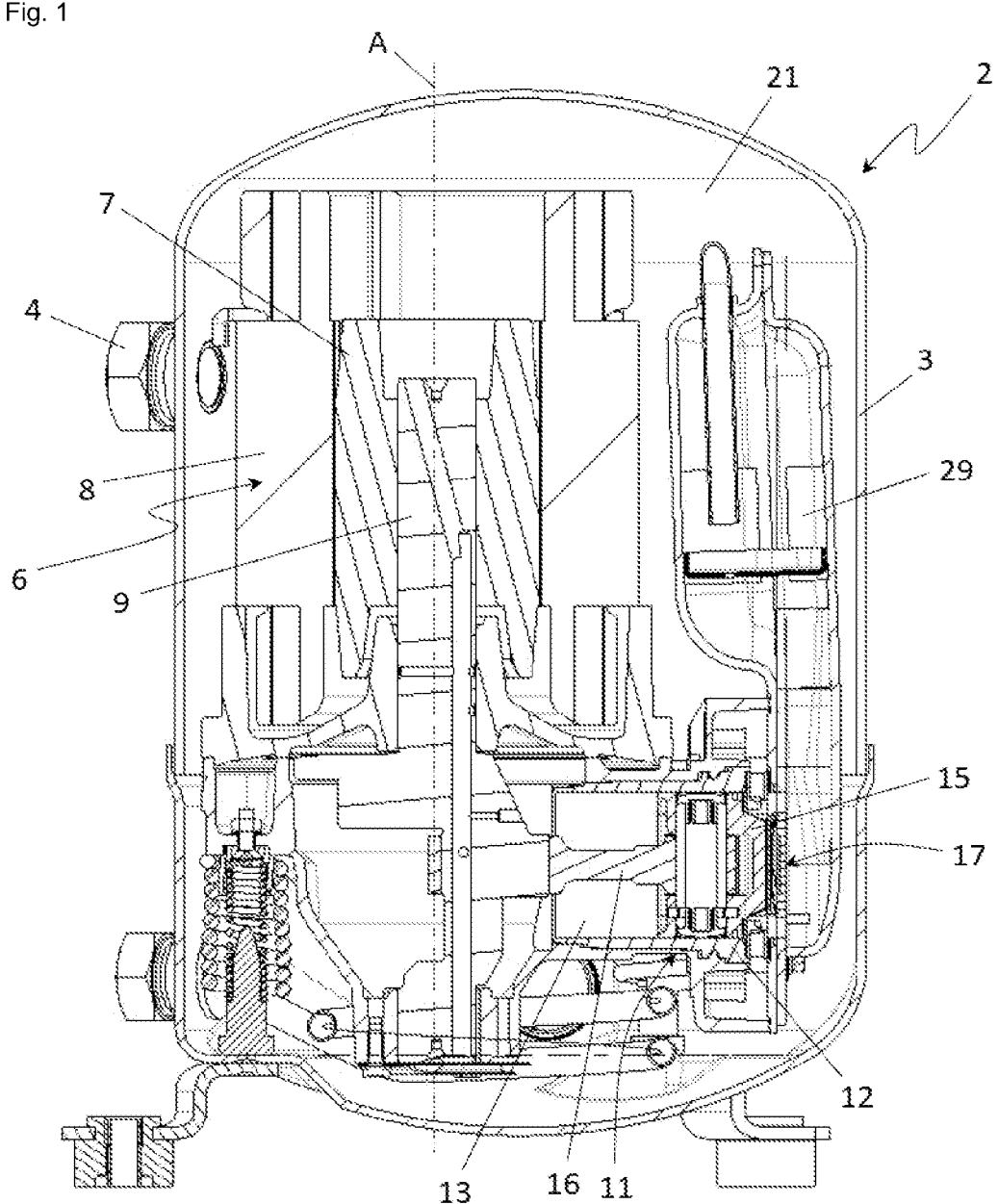
FIG. 1 is a longitudinal cross section view of a refrigerant reciprocating compressor according to the invention.

FIG. 1 shows a refrigerant compressor 2, and particularly a refrigerant reciprocating compressor, occupying a vertical position. However, the refrigerant compressor 2 according to the invention could occupy an inclined position, or a horizontal position, without significant modification to its structure.

The refrigerant compressor 2 comprises a hermetic casing 3, a suction inlet 4 provided on the hermetic casing 3 and configured to supply the refrigerant compressor 2 with refrigerant to be compressed, and a discharge outlet provided on the hermetic casing 3 and configured to discharge compressed refrigerant.

The refrigerant compressor 2 further includes an electric motor 6, which is disposed in the hermetic casing 3 and has a rotor 7 and a stator 8 disposed around the rotor 7, and a drive shaft 9, also named crankshaft, which is vertical and rotatable around a rotational axis A. The drive shaft 9 is coupled to the rotor 7 of the electric motor 6 such that the electric motor 6 is configured to drive in rotation the drive shaft 9 about the rotational axis A.

The refrigerant compressor 2 also includes a reciprocating compression unit 11 disposed in the hermetic casing 3 and configured to compress the refrigerant supplied by the suction inlet 4.

The reciprocating compression unit 11 includes a cylinder block 12 provided with a cylinder 13 partially defining a compression chamber 14, and a piston 15 reciprocatingly received in the cylinder 13 and drivingly connected to the drive shaft 9 through a connecting rod 16. The connecting rod 16 is particularly configured to convert the rotational movement of the drive shaft 9 into a reciprocating movement of the piston 15 inside the cylinder 13 in a reciprocating manner along a suction stroke during which refrigerant is sucked into the compression chamber 14 and a compression stroke during which refrigerant is compressed in the compression chamber 14 and then discharged out of the compression chamber 14.

The refrigerant compressor 2 further includes a discharge valve arrangement 17 configured to control and guide suction of refrigerant into the compression chamber 14 and discharge of the compressed refrigerant out of the compression chamber 14.

The discharge valve arrangement 17 includes a valve plate 18 secured to cylinder block 12 such that the valve plate 18, the cylinder 13 and the piston 15 delimit the compression chamber 14. According to an embodiment of the invention, the valve plate 18 has a valve thickness of about 1, 2 mm.

The valve plate 18 includes a first face 18.1 oriented towards the compression chamber 14 and a second face 18.2 opposite to the first face 18.1. The piston 15 is particularly slidingly mounted in the cylinder 13 between an extreme suction position in which the piston 15 is removed from the first face 18.1 of the valve plate 18 and an extreme discharge position in which the piston 15 is located near the first face 18.1 of the valve plate 18.

The valve plate 18 includes one or several suction passage(s) 19 emerging in the compression chamber 14 and configured to be fluidly connected to a suction chamber 21 of the refrigerant compressor 2, and a suction valve (not shown in the figures) configured to allow a flow of refrigerant through the suction passage(s) 19 only from the suction chamber 21 towards the compression chamber 14.

The valve plate 18 also includes a discharge passage 22 which emerges in the compression chamber 14 and which extends through the valve thickness of the valve plate 18. Advantageously, the discharge passage 22 has a circular shape and is located in a central portion of the valve plate 18.

The valve plate 18 further includes a valve seat 23 provided on the second face 18.2 of the valve plate 18. Advantageously, the valve seat 23 is annular and surrounds the discharge passage 22.

The discharge valve arrangement 17 further includes a valve housing 24 secured to the second face 18.2 of the valve plate 18. The valve housing 24 has a cup shape and includes a bottom portion 25 facing away from the valve plate 18 and a sidewall 26 being cylindrical and extending in a perpendicular direction from the bottom portion 25 and towards the valve plate 18.

The valve housing 24 further includes several mounting portions 27, for example three, radially protruding from an outer surface of the sidewall 26 of the valve housing 24. The mounting portions 27 are secured to the valve plate 18, e.g. by rivets arranged in bores formed in the mounting portions 27.

The valve housing 24 also includes several discharge openings 28 formed in the sidewall 26 of the valve housing 24 and distributed around an axial axis B of the valve housing 24. Each discharge opening 28 may for example extend in a circumferential direction with respect to the axial axis B of the valve housing 24. Advantageously, each discharge opening 28 is located adjacent the second face 18.2 of the valve plate 18 and extends between two adjacent mounting portions 27. The discharge openings 28 are particularly configured to allow a flow of compressed gas from the discharge passage 22 and towards a discharge chamber 29 of the refrigerant compressor 2.

The discharge valve arrangement 17 further includes a valve member 31 having a plate shape and being arranged within an inner space defined by the bottom portion 25 and the sidewall 26 of the valve housing 24. Advantageously, the valve member 31 has a circular plate shape, i.e. a disc shape, and has a valve stroke of about 2 mm.

Figure 2:
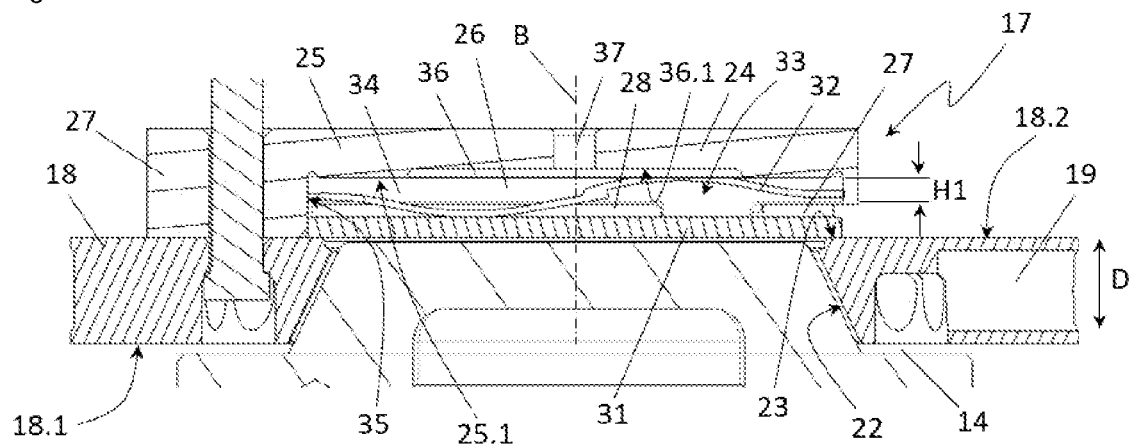
FIG. 2 is a longitudinal cross section view of a discharge valve arrangement of the refrigerant reciprocating compressor of FIG. 1 showing a valve member in a closed position.
Figure 3:
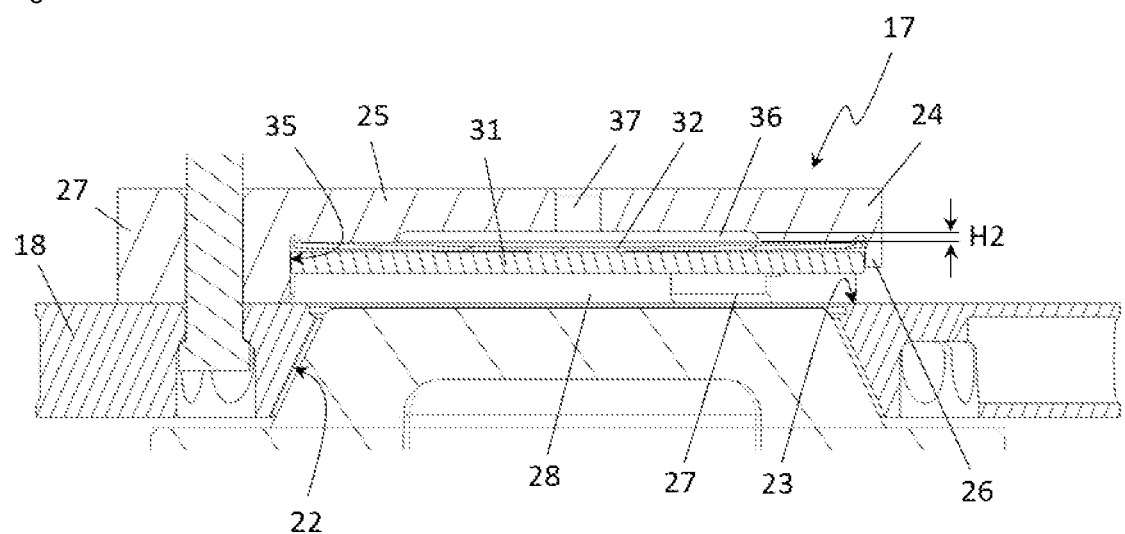
FIG. 3 is a longitudinal cross section view of the discharge valve arrangement of FIG. 2 showing the valve member in the open position.
Figure 4:
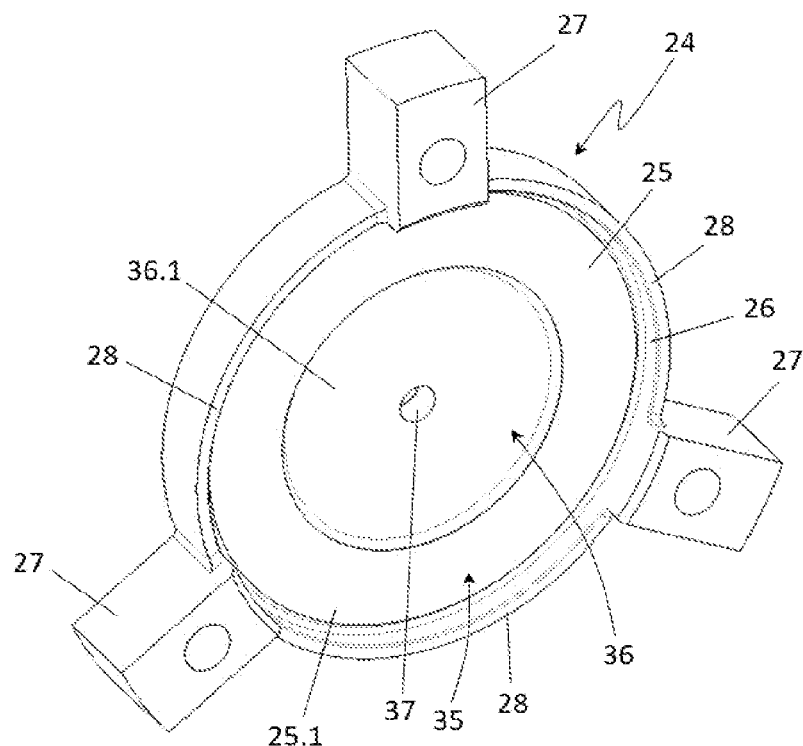
FIG. 4 is a perspective view of a valve housing of the discharge valve arrangement of FIG. 2.
Figure 5:
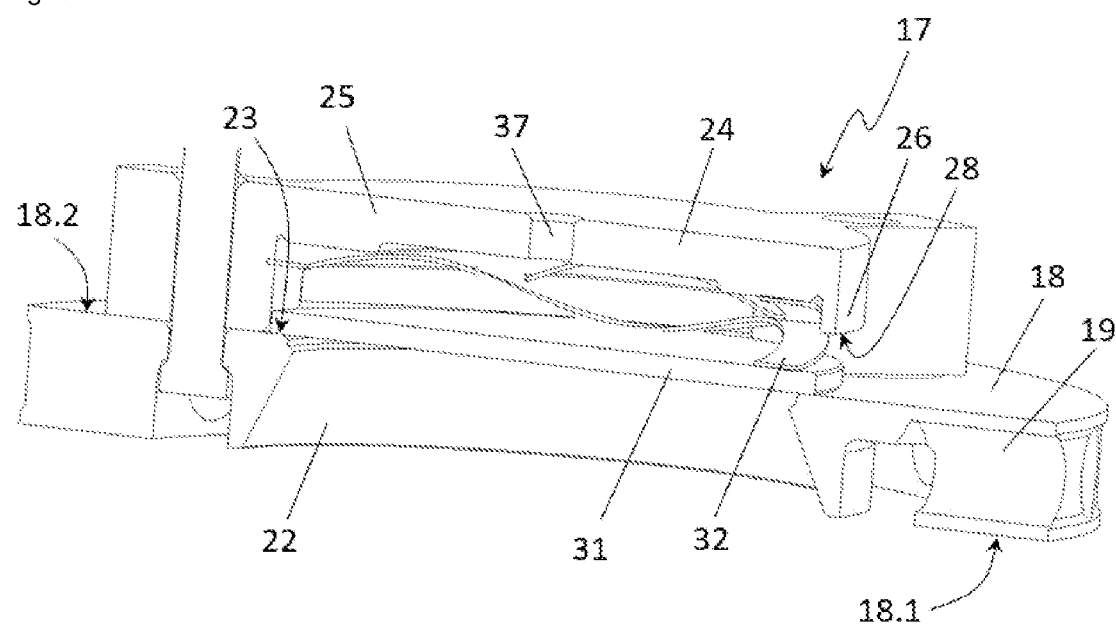
FIG. 5 is a perspective view in cross section of the discharge valve arrangement of FIG. 2.

The valve member 31 is displaceable inside the inner space along a displacement direction D, which is substantially parallel to the axial axis B of the valve housing 24, and between a closed position (see FIG. 2) in which the valve member 31 bears against the valve seat 23 and closes the discharge passage 22, and an open position (see FIG. 3) in which the valve member 31 is remote from the valve seat 23 and opens the discharge passage 22 such that the discharge openings 28 are fluidly connected to the discharge passage 22. Advantageously, the valve housing 24 is configured to retain the valve member 31 in the inner space of the valve housing 24, and the sidewall 26 of the valve housing 24 is configured to guide the valve member 31 during its displacements between the closed position and the open position.

The discharge valve arrangement 17 further includes a biasing member 32 configured to bias the valve member 31 against the valve seat 23. Advantageously, the biasing member 32 is annular and has an outer diameter which is substantially equal to the outer diameter of the valve member 31. The biasing member 32 may be a helical spring, a wave spring, a curved spring washer or a wave spring washer. The wave spring may include a single wave ring or may include wave rings stacked and attached to one another in crest to crest configuration. A crest to crest spring allows relatively large strokes, while having a reduced total height in its compressed state compared to helical springs with same stiffness.

According to the present invention, the valve housing 24 further includes a gas damping device 33 including a gas damping chamber 34 defined by the bottom portion 25 and the sidewall 26 of the valve housing 24, and corresponding to a portion of the inner space of the valve housing 24.

According to the embodiment shown on the figures, the gas damping chamber 34 includes a first gas pocket 35 which has a circular shape and which is defined by a bottom surface 25.1 of the bottom portion 25 and the sidewall 26 of the valve housing 24, and a second gas pocket 36 which has also a circular shape and which is formed in the bottom surface 25.1 of the bottom portion 25. Advantageously, the first and second gas pockets 35, 36 are coaxially arranged, and the second gas pocket 36 includes a pocket bottom surface 36.1 which is parallel to the bottom surface 25.1 of the bottom portion 25.

The first gas pocket 35 has a first diameter slightly larger than an outer diameter of the valve member 31, and the second gas pocket 36 has a second diameter smaller than the outer diameter of the valve member 31. Advantageously, the first gas pocket 35 at least partially accommodates the biasing member 32 and is configured to accommodate the valve member 31 when the valve member 31 is in the open position.

The first gas pocket 35 has a first gas pocket depth H1 which may be between a first minimal depth value being equal to 0.1 times the valve thickness of the valve member 31 and a first maximal depth value being equal to 4 times the displacement stroke of the valve member 31, and the second gas pocket 36 has a second gas pocket depth H2 which may be between a second minimal depth value being equal to 0.1 times the valve thickness of the valve member 31 and a second maximal depth value being equal to 4 times the displacement stroke of the valve member 31. It should be noted that the first gas pocket depth H1 of the first gas pocket 35 is the axial distance between the upper edge of the discharge openings 28 and the bottom surface 25.1 of the bottom portion 25, and that the second gas pocket depth H2 of the second gas pocket 36 is the axial distance between the bottom surface 25.1 of the bottom portion 25 and the pocket bottom surface 36.1 of the second gas pocket 36.

According to an embodiment of the invention, the first gas pocket depth H1 may be about 1.6 mm, and the second gas pocket depth H2 may be about 0.5 mm.

According to an embodiment of the invention, the first diameter of the first gas pocket 35 is between a minimal diameter value being equal to 10 times the sum of the first and second gas pocket depths and a maximal diameter value being equal to 20 times the sum of the first and second gas pocket depths. According to an embodiment of the invention, the first diameter of the first gas pocket 35 is about 32 mm.

The gas damping device 33 also includes an exhaust opening 37 formed in the bottom portion 25 and emerging in the second gas pocket 36. Advantageously, the exhaust opening 37 and the first and second gas pockets 35, 36 are coaxially arranged. The exhaust opening 37 is particularly configured to fluidly connect the second gas pocket 36 with the discharge chamber 29 of the refrigerant compressor 2.

According to an embodiment of the invention, the exhaust opening 37 has an exhaust diameter which is between a minimal exhaust diameter being equal to the valve thickness of the valve member 31 and a maximal exhaust diameter being equal to 4 times the displacement stroke of the valve member 31. The exhaust diameter of the exhaust opening 37 may for example be around 2.5 mm.

The operation of the discharge valve arrangement 17 is describe below.

During the compression stroke of the piston 15, the pressure in the compression chamber 14 increases until said pressure exceeds the sum of the pressure in the gas damping chamber 34 (i.e. in the discharge chamber 29) and the pressure exerted by the biasing member 32 on the valve member 31. Then, the valve member 31 moves away from the valve plate 18 and opens the discharge passage 22. When the upper edge of the valve member 31 reaches the upper edge of the discharge openings 28 (i.e. when the valve member 31 is at least partially accommodated in the first gas pocket 35), the gas contained in the gas damping chamber 34 flows out of the gas damping chamber 34 only through the exhaust opening 37 and a small radial clearance between the valve member 31 and the sidewall 26. Such a reduced gas passage provides damping effect which decelerates the valve member 31 and avoids an impact between the valve member 31 and the bottom surface 25.1 of the bottom portion 25.

The exhaust diameter of the exhaust opening 37 is particularly configured to tune the increase of gas pressure within the gas damping chamber 34 during the opening movement of the valve member 31, and hence the deceleration of the valve member 31. The exhaust diameter of the exhaust opening 37 also ensures a fast closing of the valve member 31 at the end of the compression stroke of the piston 15, by allowing a flow of gas at discharge pressure, through the exhaust opening 37, from the discharge chamber 29 into the gas damping chamber 34.

According to another embodiment of the invention not shown on the figures, the cylinder block 12 may include several cylinders 13 and the refrigerant compressor 2 may include several pistons 15 each reciprocatingly received in a respective cylinder 13.

Of course, the invention is not restricted to the embodiment described above by way of non-limiting example, but on the contrary it encompasses all embodiments thereof.

The invention claimed is:

1. A discharge valve arrangement for a refrigerant compressor, including:
    a valve plate configured to be secured to the refrigerant compressor, the valve plate including a discharge passage, which is configured to be fluidly connected to a compression chamber of the refrigerant compressor, and a valve seat surrounding the discharge passage,
    a valve housing being secured to the valve plate, the valve housing including a bottom portion facing away from the valve plate and a sidewall extending from the bottom portion and towards the valve plate, the bottom portion and the sidewall defining an inner space, the valve housing further including at least one discharge opening formed in the sidewall of the valve housing between a lower edge of the sidewall and an upper face of the valve plate, wherein the valve plate forms an edge of the discharge opening, and configured to allow a flow of compressed gas from the discharge passage and towards a discharge chamber of the refrigerant compressor,
    a valve member having a plate shape and being arranged within the inner space of the valve housing, the valve member being displaceable between a closed position in which the valve member bears against the valve seat and closes the discharge passage, and an open position in which the valve member is remote from the valve seat and the at least one discharge opening is fluidly connected to the discharge passage, and
    a biasing member configured to bias the valve member against the valve seat,
    wherein the valve housing includes a gas damping device including:
    a gas damping chamber defined by the bottom portion and the sidewall of the valve housing, the biasing member being at least partially arranged within the gas damping chamber and the gas damping chamber being configured to accommodate the valve member when the valve member is in the open position, and
    an exhaust opening formed in the bottom portion and emerging in the gas damping chamber, the exhaust opening being configured to fluidly connect the gas damping chamber with the discharge chamber of the refrigerant compressor.

2. The discharge valve arrangement according to claim 1, wherein the valve member has a circular plate shape.

3. The discharge valve arrangement according to claim 1, wherein the gas damping chamber includes:
    a first gas pocket defined by a bottom surface of the bottom portion and the sidewall of the valve housing, the first gas pocket at least partially housing the biasing member and being configured to accommodate the valve member when the valve member is in the open position, the first gas pocket having a first pocket depth, and
    a second gas pocket formed in the bottom surface of the bottom portion, the exhaust opening emerging in the second gas pocket and being configured to fluidly connect the second gas pocket with the discharge chamber of the refrigerant compressor, the second gas pocket having a second pocket depth.

4. The discharge valve arrangement according to claim 2, wherein the first gas pocket has a circular shape and has a first diameter larger than an outer diameter of the valve member.

5. The discharge valve arrangement according to claim 4, wherein the second gas pocket has a circular shape and has a second diameter smaller than the outer diameter of the valve member.

6. The discharge valve arrangement according to claim 4, wherein the first diameter of the first gas pocket is between a minimal diameter value being equal to 10 times the sum of the first and second gas pocket depths and a maximal diameter value being equal to 20 times the sum of the first and second gas pocket depths.

7. The discharge valve arrangement according to claim 3, wherein the first gas pocket depth of the first gas pocket is between a first minimal depth value being equal to 0.1 times the valve thickness of the valve member and a first maximal depth value being equal to 4 times the displacement stroke of the valve member.

8. The discharge valve arrangement according to claim 3, wherein the second gas pocket depth of the second gas pocket is between a second minimal depth value being equal to 0.1 times the valve thickness of the valve member and a second maximal depth value being equal to 4 times the displacement stroke of the valve member.

9. The discharge valve arrangement according to claim 1, wherein the exhaust opening has an exhaust diameter which is between a minimal exhaust diameter being equal to the valve thickness of the valve member and a maximal exhaust diameter being equal to 4 times the displacement stroke of the valve member.

10. The discharge valve arrangement according to claim 1, wherein the first and second gas pockets are coaxially arranged.

11. The discharge valve arrangement according to claim 1, wherein the exhaust opening is centrally located in the bottom portion.

12. The discharge valve arrangement according to claim 1, wherein the valve housing has a cup shape.

13. The discharge valve arrangement according to claim 1, wherein the discharge passage provided on the valve plate has a circular shape.

14. The discharge valve arrangement according to claim 1, wherein the valve housing further includes mounting portions radially protruding from an outer surface of the sidewall of the valve housing, the mounting portions being secured to the valve plate.

15. A refrigerant reciprocating compressor including the discharge valve arrangement according to claim 1.

16. The discharge valve arrangement according to claim 14, wherein the at least one discharge opening extends between two adjacent mounting portions.

* * * * *